United States Patent
Luick

(10) Patent No.: US 7,219,185 B2
(45) Date of Patent: May 15, 2007

(54) APPARATUS AND METHOD FOR SELECTING INSTRUCTIONS FOR EXECUTION BASED ON BANK PREDICTION OF A MULTI-BANK CACHE

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/829,621

(22) Filed: Apr. 22, 2004

(65) Prior Publication Data

US 2005/0240733 A1    Oct. 27, 2005

(51) Int. Cl.
G06F 12/00 (2006.01)
(52) U.S. Cl. .............................. 711/5; 711/1; 711/100; 711/118; 711/127; 711/131; 711/149; 365/230.03; 365/230.04; 365/230.05; 712/205; 712/206
(58) Field of Classification Search ................ 711/213, 711/131, 5, 1, 100, 118, 127, 149; 365/230.03, 365/230.04, 230.05; 712/205, 206
See application file for complete search history.

(56) References Cited

U.S. PATENT DOCUMENTS

| | | | |
|---|---|---|---|
| 5,933,860 A * | 8/1999 | Emer et al. .................. | 711/213 |
| 6,629,268 B1 * | 9/2003 | Arimilli et al. ................ | 714/42 |
| 2002/0152368 A1 * | 10/2002 | Nakamura ................... | 712/226 |
| 2004/0088489 A1 * | 5/2004 | Hironaka et al. ........... | 711/131 |
| 2004/0199752 A1 * | 10/2004 | Winberg et al. ............. | 712/225 |
| 2004/0210749 A1 * | 10/2004 | Biles .......................... | 712/240 |
| 2005/0182907 A1 * | 8/2005 | Shen et al. .................. | 711/146 |
| 2005/0262332 A1 * | 11/2005 | Rappoport et al. ......... | 712/239 |

* cited by examiner

Primary Examiner—Stephen C. Elmore
Assistant Examiner—Daniel Kim
(74) Attorney, Agent, or Firm—Roy W. Truelson

(57) ABSTRACT

A processor having the capability to dispatch multiple parallel operations, including multiple load operations, accesses a cache which is divided into banks. Each bank supports a limited number of simultaneous read and write access operations. A bank prediction field is associated with each memory access operation. Memory access operations are selected for dispatch so that they are predicted to be non-conflicting. Preferably, the processor automatically maintains a bank predict value based on previous bank accesses, and a confirmation value indicating a degree of confidence in the bank prediction. The confirmation value is preferably an up-or-down counter which is incremented with each correct prediction and decremented with each incorrect prediction.

20 Claims, 8 Drawing Sheets

APPARATUS AND METHOD FOR SELECTING INSTRUCTIONS FOR EXECUTION BASED ON BANK PREDICTION OF A MULTI-BANK CACHE

FIELD OF THE INVENTION

The present invention relates to digital data processing hardware, and in particular to the design and operation of cached memory and supporting hardware for processing units of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip. The reduced size made it possible to increase the clock speed of the processor, and accordingly increase system speed.

In addition to increasing clock speeds, it is possible to improve system throughput by using multiple copies of certain components, and in particular, by using multiple CPUs. Without delving too deeply into the architectural issues introduced by using multiple CPUs, it can still said that there are benefits to increasing the throughput of the individual CPU, whether or not a system uses multiple CPUs. For a given clock speed, it is possible to increase the throughput of an individual CPU by increasing the average number of operations executed per clock cycle.

Various advances in parallelism have enabled computer system designers to increase the average number of operations executed per clock cycle within an individual CPU. For example, certain wide instruction computers (sometimes known as "wide issue superscalar" or "very long instruction word" computers) enable each instruction to specify multiple operations to be performed in parallel, and accordingly contain parallel hardware necessary for executing such wide instructions. However, generating programming code which takes full advantage of this capability is somewhat difficult. Another approach to parallelism, which can sometimes be combined with other techniques, is support for multiple threads of execution ( i.e., multiple streams of encoded instructions) within a single computer processor. Multi-threaded processors generally have parallel banks of registers which permit the processor to maintain the state of multiple threads of execution at one time.

Recently, another approach to parallelism has gained favor, in which the CPU can dispatch multiple instructions for execution in a given clock cycle. Using this approach, the hardware analyzes the instruction stream to determine whether dependencies exist (i.e., whether one instruction must wait for a previous instruction to be performed first), and selects non-conflicting instructions for parallel execution where possible. This approach may be used with a multi-threaded processor or a single-threaded processor.

Any form of parallelism within a processor generally requires additional hardware, in some cases duplicating entire sets of logic circuits, registers or other components. But it is also true that there should be some commonality, otherwise nothing is gained over a mere duplication of the processor itself and all associated supporting circuits.

Most computer systems store data in a hierarchy of memory or storage devices, each succeeding level having faster access, but storing less data. At the lowest level is the mass storage unit or units, which store all the data on relatively slow devices. Moving up the hierarchy is a main memory, which is generally semiconductor memory. Main memory has a much smaller data capacity than the storage units, but a much faster access. Higher still are caches, which may be at a single level, or multiple levels (level 1 being the highest), of the hierarchy. Caches are also semiconductor memory, but are faster than main memory, and again have a smaller data capacity.

When the processor needs data, it looks for it first in the cache, and if the cache is a multi-level cache, will look first in the highest level cache. Retrieving data from lower level caches, main memory, or disk storage requires progressively more time, so much time that a processor can spend the bulk of its time merely waiting for data to be retrieved. One way in which the average number of operations per clock cycle can be increased is to increase the proportion of times that needed data is in the cache (a "cache hit"), and preferably at the highest level, rather than some entity lower on the memory hierarchy. Various techniques exist for selecting data to be held in the cache, but all other things being equal, the probability of a cache hit can be increased by increasing the size of the cache.

Where a computer processor employs any of various parallelism techniques, it is possible that multiple accesses, such as multiple reads, to the same cache will take place simultaneously. Simple semiconductor memory designs support only a single read access to a bank of memory devices at one time. The cache can therefore become a bottleneck to performance in a processor employing parallelism.

It is possible to permit multiple simultaneous cache accesses by simply providing separate caches for each access path. For example, this approach is used in some multi-threaded processor designs, in which each thread has its own cache, which can be accessed independently of the others. But a consequence of separate caches is that each individual cache is necessarily only a fraction of the whole, which reduces the probability of a cache hit.

It is further possible to design multi-port caches, in which the individual memory cells and supporting hardware permit multiple cells to be read or written to simultaneously. However, these designs introduce significant additional circuit complexity, and as a result of the additional logic circuits required, increase the time required to access the cache.

As the demand for ever faster processors grows, it is likely that processor parallelism will increase. Further increases in the number of ports in a conventional multi-port cache design will only exacerbate the existing problems of circuit complexity and access time. It is therefore desirable to find alternative techniques for providing multiple parallel accesses to cached data, which reduce or eliminate the drawbacks associated with conventional techniques.

SUMMARY OF THE INVENTION

A processor having the capability to dispatch multiple parallel operations, and in particular multiple memory access operations (e.g., load operations), accesses a cache which is divided into banks. Each bank supports a limited number of simultaneous read and write access operations. A bank prediction field is associated with each memory access operation. Memory access operations are selected for dispatch so that they are predicted to be non-conflicting.

In the preferred embodiment, the processor selects multiple instructions in one or more threads for dispatch in each processor cycle. The processor maintains a bank prediction field for each memory access instruction. The bank prediction field contains an identifier of the cache bank in which the data was located when the instruction was last executed. This value is taken as the likely bank in which the data will be found when the instruction is next executed. When the processor selects instructions for dispatch in a particular cycle, it considers the bank prediction value of load or store instructions to avoid instructions which would cause a conflict by exceeding the port capacity of a cache bank.

In the preferred embodiment, an L1 data cache is divided into banks. Each bank contains a single write port and dual read ports, i.e., it is physically possible to perform a single write, or two reads, to each bank in any given cycle. This allows the individual memory cells within each bank to utilize an efficient conventional design without a large number of ports. The banks are preferably interleaved within each cache line. I.e., the data in each cache line is interleaved among the various banks. In the illustrative preferred embodiment described herein, a cache line contains 128 bytes, and the cache is divided into two banks, each bank containing 64 bytes of each cache line, it being understood that a different size of cache line or number of cache banks could be used.

In one aspect of the preferred embodiment, a confirmation field is maintained for each load instruction, the confirmation field reflecting recent history of correct bank predictions. Where the value in the confirmation field is sufficiently low (indicating poor prediction accuracy for the corresponding instruction), the bank prediction field is regarded as unreliable, and the instruction is treated as one which could access any bank.

In one aspect of the preferred embodiment, bank prediction history data is maintained for each page of instruction data in the form of an up-or-down counter. The counter is incremented if a bank prediction is correct, and decremented if incorrect. The cumulated count indicates whether data references follow a predictable (aligned) pattern. Such data may be used by an optimizing compiler for adjusting the data alignment of program segments showing poor bank prediction.

It has been observed that most load instructions follow a highly predictable pattern of bank accesses, and will access the same bank time and again. By saving the last bank access, it is possible to predict the next bank with a high probability. As a result, the processor can select instructions for execution to avoid bank conflicts, and thus utilize a much simpler and faster physical cache design. Although the bank prediction will occasionally be inaccurate (causing a conflict, and consequent re-starting of the load pipeline), the effect on performance of these occasional conflicts is likely to be outweighed by the faster cache circuitry and other savings resulting from reduced cache complexity.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
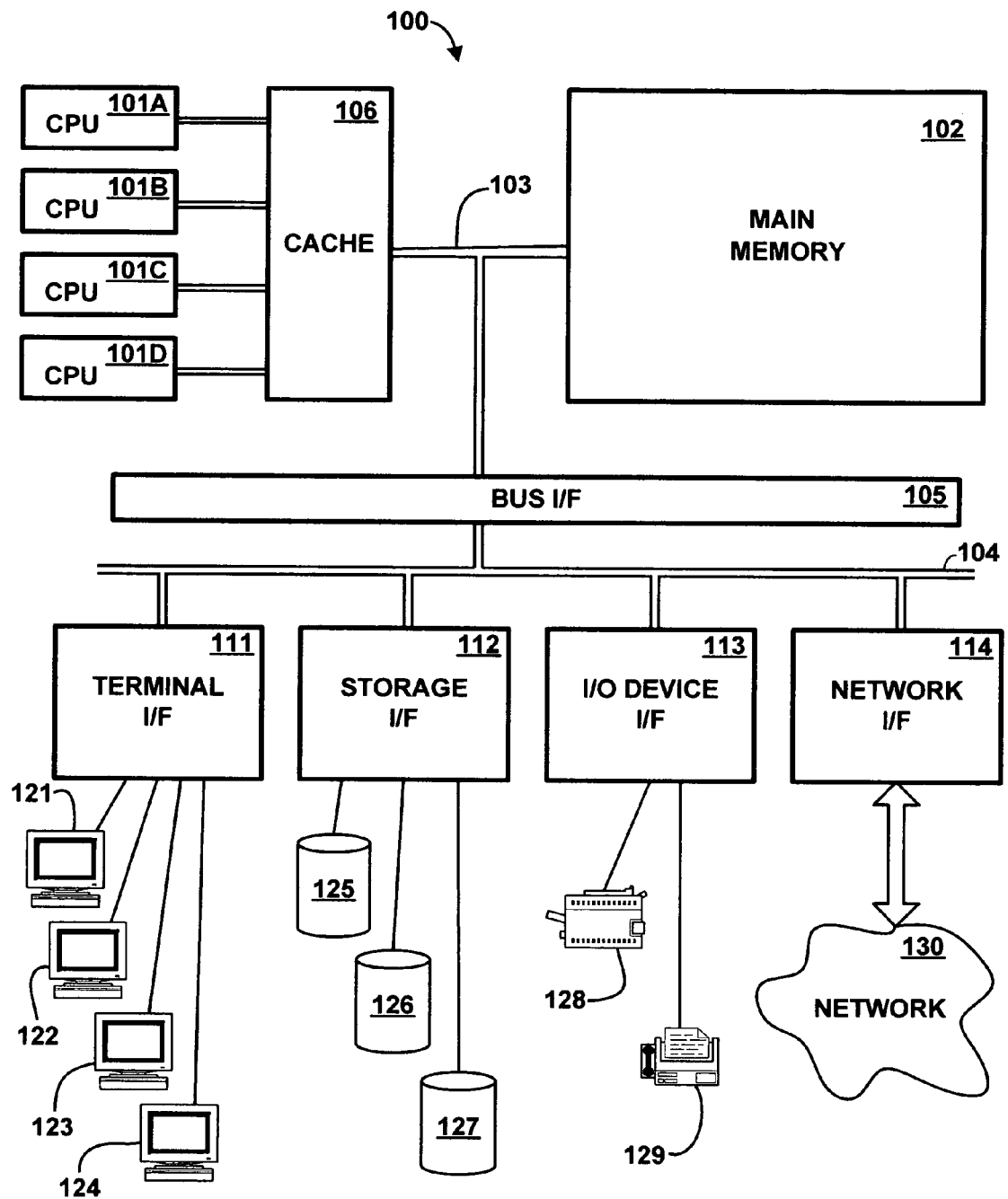
FIG. 1 is a high-level block diagram of the major hardware components of a computer system utilizing a banked cache and bank prediction, according to the preferred embodiment of the present invention.

Referring to the Drawing, wherein like numbers denote like parts throughout the several views, FIG. 1 is a high-level representation of the major hardware components of a computer system 100 utilizing a banked cache and bank prediction, according to the preferred embodiment of the present invention. The major components of computer system 100 include one or more central processing units (CPU) 101A–101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A–101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and data are loaded into cache memory 106 from main memory 102 for processing. Main memory 102 is a random-access semiconductor memory for storing data and programs. Although main memory 102 and cache 106 are represented conceptually in FIG. 1 as single entities, it will be understood that in fact these are more complex, and in particular, that cache exists at multiple different levels, as described in greater detail herein.

Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111–114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–124. Storage interface unit 112 supports the attachment of one or more direct access storage devices (DASD) 125–127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
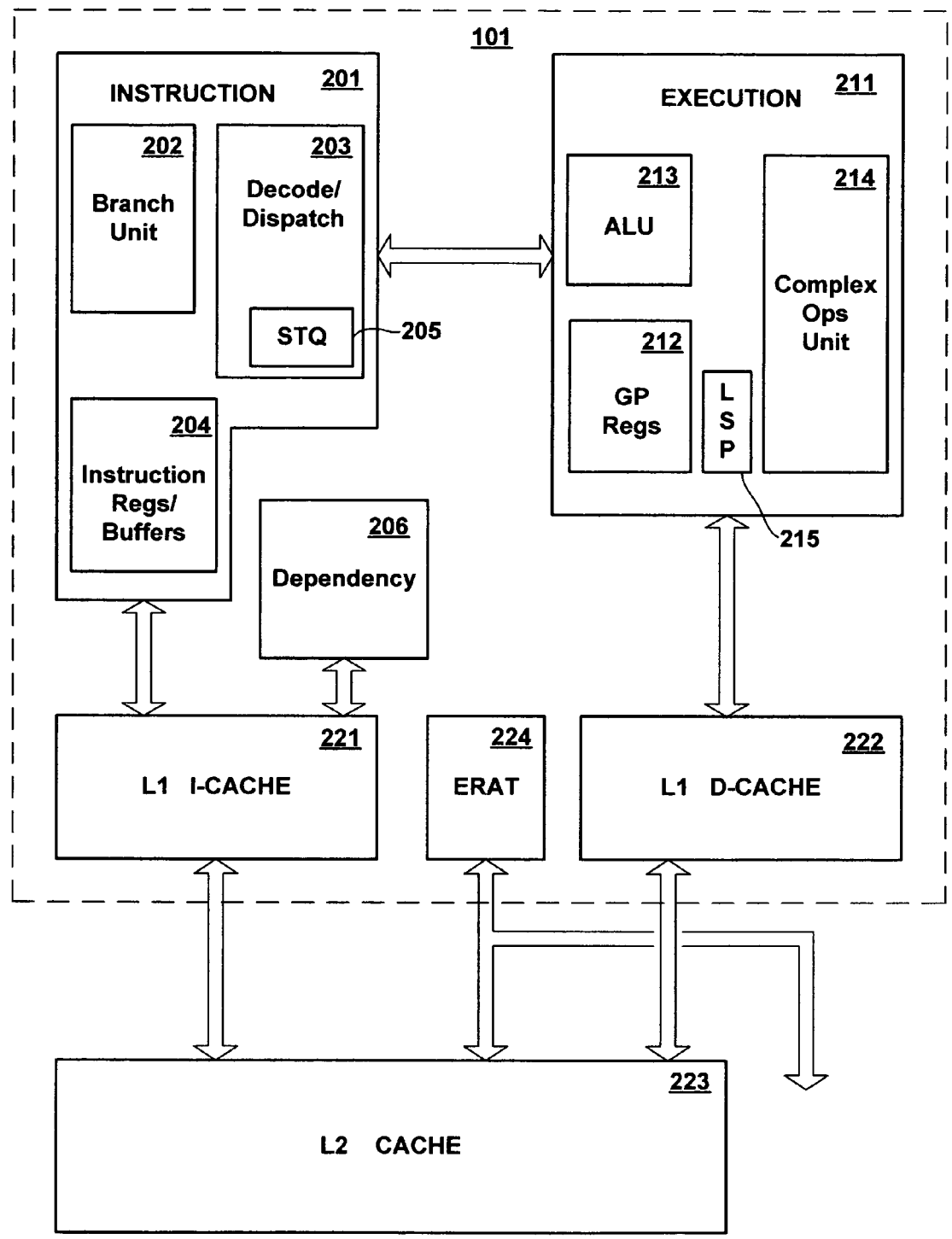
FIG. 2 is a high-level diagram of the major components of a CPU in the computer system of the preferred embodiment.

FIG. 2 is a high-level diagram of the major components of CPU 101 including certain associated cache structures, according to the preferred embodiment, showing CPU 101 in greater detail than is depicted in FIG. 1. In this embodiment, two CPUs 101, along with certain cache structures, are packaged in a single semiconductor chip, and for this reason CPU 101 is sometimes referred to as a "processor core" or "CPU core", to distinguish it from the chip containing a pair of CPUs. CPU 101 includes instruction unit portion 201, execution unit portion 211, Level 1 Instruction Cache (L1 I-Cache) 221, Level 1 Data Cache (L1 D-Cache) 222, Effective-to-Real Address Table (ERAT) 224, and dependency check unit 206. Level 2 Cache (L2 Cache) 223, shown in FIG. 2, is actually shared by both CPU cores within a single chip, and therefore not considered a part of CPU 101. In general, instruction unit 201 obtains instructions from L1 I-cache 221, decodes instructions to determine operations to perform, and resolves branch conditions to control program flow. Execution unit 211 performs arithmetic and logical operations on data in registers, and loads or stores data from L1 D-Cache 222. L2 Cache 223 is a level 2 cache, generally larger that L1 I-Cache 221 or L1 D-Cache 222, providing data to L1 I-Cache 221 and L1 D-Cache 222. L2 Cache 223 obtains data from a lower level cache (e.g. L3 cache) or main memory, through an external interface.

Instruction unit 201 comprises branch unit 202, instruction decode/dispatch unit 203 (including storage op queue 205), and instruction registers and buffers 204. Instructions from L1 I-cache 221 are loaded into buffers 204 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 203 selects one or more instructions to be dispatched for execution from one or more of buffers 204 in a current machine cycle, and decodes the instruction(s) to determine the operation(s) to be performed or branch conditions. Branch unit 202 controls the program flow by evaluating branch conditions, and refills buffers 204 from L1 I-cache 221.

Execution unit 211 comprises a set of general purpose registers 212 for storing data and an integer arithmetic logic unit (ALU) 213 for performing arithmetic and logical operations on data in GP registers 212 responsive to instructions decoded by instruction unit 201. Execution unit further includes complex operations subunit 214 for performing mathematically intensive operations, such as floating point operations. Subunit 214 may include its own special registers (not shown). Integer ALU 213 and complex operations subunit 214 are typically implemented as multi-stage pipelines. Execution unit further includes load/store pipeline control hardware 215, which controls the sequencing of loading and storing data from and to L1 D-Cache 222. In addition to components shown in FIG. 2, execution unit may include additional special purpose registers and counters, control hardware, and so forth. In particular, execution unit 211 may include pipelines (not shown) in addition to integer ALU 213, complex operations subunit 214, and load/store pipe 215. Additional pipelines, such as an instruction fetch and decode pipeline, may exist within processor 101.

L1 I-cache 221 and L1 D-cache 222 are separate instruction and data caches providing data to instruction and execution units. L2 cache 223 is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 223, which in turn obtains it from an external location, and then transferred from L1 cache to the corresponding unit. Depending on the processor design, it may be possible to by-pass L1 cache and load data from L2 cache 223 to an execution or instruction register.

ERAT 224 translates effective addresses generated by instruction unit 201 or execution unit 211 to corresponding real addresses in memory. In the preferred embodiment, the processor generates "effective addresses" in an effective address space corresponding to each respective executing process. Effective addresses are translated to "virtual addresses" in a larger universal virtual address space, there being one virtual address space shared by all processes. The virtual addresses are further translated to "real addresses", corresponding to the actual memory locations at which the data is located. However, it will be understood that various computer architectures employ different addressing constructs, and the present invention is not limited to any particular form of addressing.

L1 I-Cache 221 and L1 D-Cache 222 are preferably addressed using effective addresses, and therefore no address translation is required for accessing the level 1 caches. However, the L2 Cache 223 and all memory below it are addressed using real addresses. Therefore, if it is necessary to access a lower level cache or main memory, an effective address generated by the processor is first translated to a real address. ERAT 224 is essentially an address translation cache used for translating addresses. Address translation entries not in ERAT 224 are obtained from a translation look-aside buffer, or from main memory. In the preferred embodiment, the ERAT is constructed as two separately accessible address translation structures, one of which is used to translate addresses of instructions to be loaded to L1 I-Cache 221, and the other of which is used to translate addresses of data to be loaded to L1 D-Cache 222; however the ERAT could be a single combined structure.

In the preferred embodiment, CPU 101 is a multithreaded processor supporting the concurrent execution of multiple threads and simultaneous dispatching of instructions from different threads in the same machine cycle. In the preferred embodiment, the concurrent execution of two independent threads is supported, it being understood that this number may vary. Each instruction executed in CPU 101 performs a single primitive operation, such as a load, a store, an integer arithmetic or logical operation using operands from GP registers, a complex operation (such as a floating point multiply or add) using complex operations unit 214, or a branch. Decode/dispatch unit 203 can simultaneously dispatch multiple such instructions in a single machine cycle, although it should be understood that, the execution unit being pipelined, the actual execution of instructions may overlap those dispatched in different cycles. In particular, decode/dispatch unit 203 can dispatch multiple load instructions in a single cycle, causing data to be loaded from L1 D-Cache 222 to registers within execution unit 211. In the preferred embodiment, up to four load instructions may be dispatched in a single cycle, although this number may vary.

Instructions within each executing thread are grouped in groups of non-dependent sequential instructions. When instructions are loaded into L1 I-Cache 221 from L2 Cache, dependency check unit 206 automatically analyzes the instruction stream to determine which instructions can be executed concurrently or out of sequence. The dependency check unit divides the instruction stream into groups of sequential instructions by placing a stop bit at the last instruction of each group. Within any group, the instructions have no dependencies and can safely be executed out of sequence. Specifically, with respect to each instruction, dependency check unit determines whether there is some dependency upon completion of a previous instruction in the same group. Dependency depends on the type of instruction and the operand(s). Where two different instructions reference the same operand, this often, but not always, creates a dependency. E.g., if both instructions use the same operand as a source for data which is read or input to some pipeline, it is possible that no dependency exists. But if a first instruction writes to an operand location and a subsequent instruction reads from the same location, the subsequent instruction is clearly dependent on the first, and can not be executed before or simultaneously with the first instruction. If a dependency is found within the same group, the dependency check unit places a stop bit in the immediately preceding instruction, so that the instruction being analyzed will be part of a separate group.

Instruction buffer 204 holds instructions from two independent threads. One thread is designated primary (having a higher priority of execution), and the other secondary. In each machine cycle, decode/dispatch unit 203 may select up to four instructions for dispatch to a corresponding unit (generally a pipeline) which executes the instruction. There are preferably two parallel integer ALU pipelines in integer ALU unit 313, allowing up to two integer ALU instructions to be dispatched; there is a single floating point pipeline, allowing a single floating point instruction to be dispatched; and so on. Decode/dispatch unit 203 selects instructions from the current group of instruction in the primary thread, to the extent there are unexecuted instructions in the group matching the available pipeline resources. If fewer than four instructions in the primary thread can be matched to the available pipelines, the decode/dispatch unit selects unexecuted instructions from the current group in the secondary thread. When all instructions within a group in either thread have been dispatched for execution, the next group of instructions in that thread is made available for selection on the next machine cycle.

In order to support concurrent execution of multiple threads, a separate set of GP registers 212 exist for each thread. Additionally, certain other state or special purpose registers (not shown) may be duplicated to support multiple active threads.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU 101 may have a simple or complex instruction set.

L1 caches 221 and 222 are shown in FIG. 2 as part of CPU 101 because each CPU has its own respective L1 caches. Architecturally, caches may be considered part of memory 102, or may be considered part of the CPU, or may be considered separate entities entirely. The representation of FIG. 2 is intended to be typical, and is not intended to limit the present invention to any particular physical cache implementation. The processor chip or chips may include more caches or fewer caches than represented in FIG. 2.

In accordance with the preferred embodiment, a bank predict value and a confirmation value are associated with each load instruction, while the load instruction is in certain caches or memory. By "associated", it is meant that these values are stored in the computer system in such a way that the hardware can identify a bank predict value and confirmation value for any load instruction, and do so without undue delay. A bank predict value and confirmation value could be maintained in the actual bits of cache or memory storage which make up the instruction, or in some associated bits. However, in the preferred embodiment, the bank predict value and confirmation value are not maintained in storage.

In general, the number of bits required for bank predict and confirmation is not large. In the illustrative preferred embodiment, in which there are only two banks of L1 D-cache, a single bit is required for a bank predict value. A cache design might utilize more banks, e.g. four banks or eight banks, but the number of bits required for bank predict is not likely to be large. In the preferred embodiment, the confirmation value is three bits, although this could also vary, and in some embodiments, the confirmation value might be absent entirely.

There are several ways in which bank predict values and confirmation values might be maintained. In many instruction sets, there will be unallocated bits of the instruction, or at least, unallocated bits in the load instruction, and if the instruction set contains such unallocated bits, these bits may be used for storing bank predict and/or confirmation values. Where an insufficient number of unallocated bits exist, in many instruction sets it will nevertheless be possible to reformat some portion of the load instructions in hardware to create bit vacancies from underutilized fields. Alternatively, many computer systems contain additional parity or error-correcting code (ECC) bits for each byte of cache or memory data. Because instructions do not change, it is not necessary to maintain ECC bits which can correct any corrupted data; it is merely necessary to detect corrupted data, and reload the instruction from an uncorrupted source. Therefore, some of the parity or ECC bits could be used for storing bank predict values and confirmation values. Finally, where no other alternative exists, it would be possible to provide special hardware for storing and accessing the extra bits for each load instruction, although this alternative is generally less desirable than using unallocated bits of the instruction or ECC.

Figure 3:
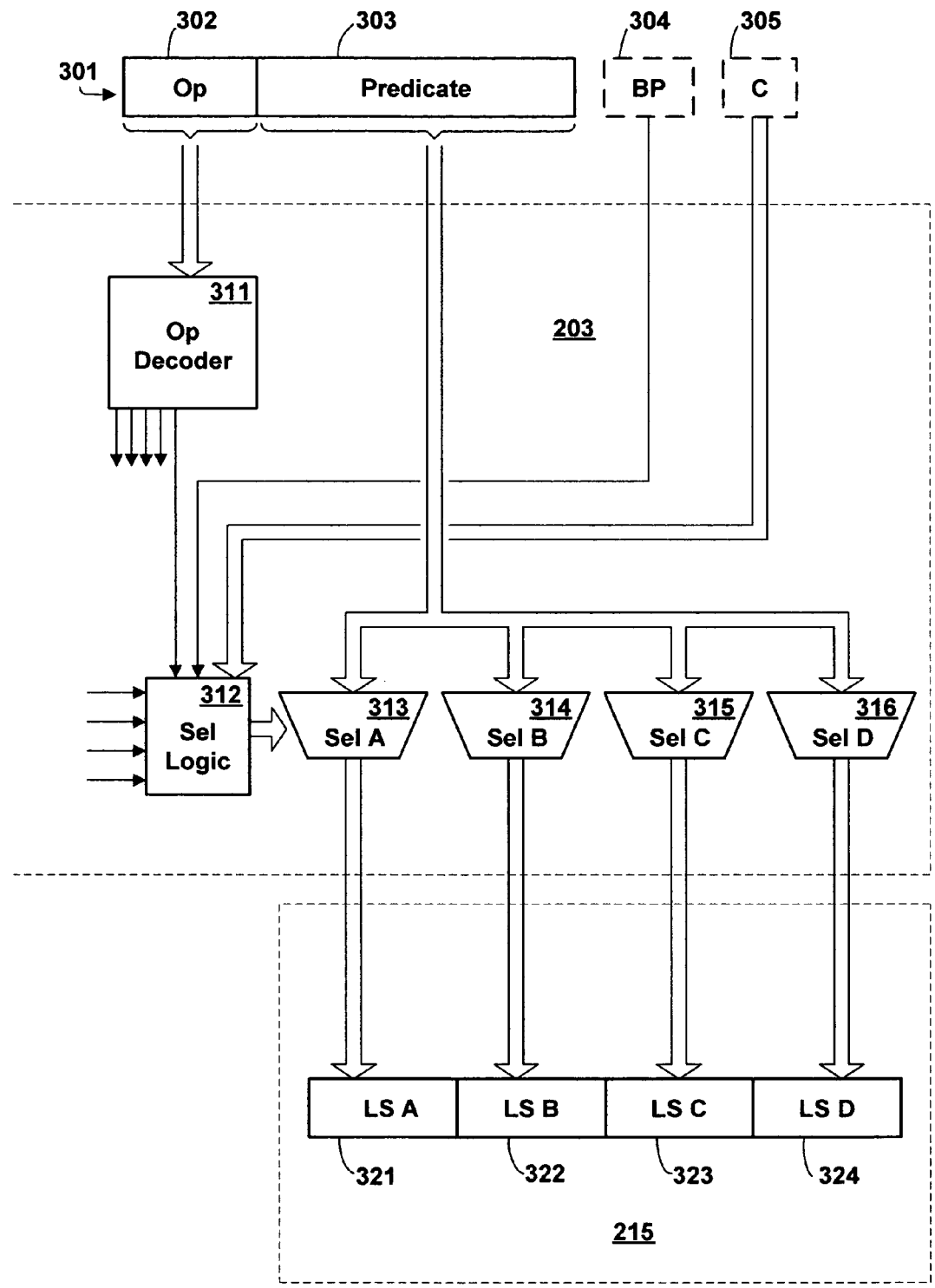
FIG. 3 is a conceptual representation of the decoding and dispatching of a load instruction, according to the preferred embodiment.

FIG. 3 is a high-level conceptual representation of the decoding and dispatching of a load instruction to load/store pipeline 215. Referring to FIG. 3, a load instruction 301 in buffers 204 contains an operation code 302 and a predicate 303, which is typically multiple fields, such as a source operand location, a destination location, flag bits, etc. Associated with the instruction is a bank predict value 304, and a confirmation value 305. As explained above, these values are preferably maintained within the instruction itself, in unallocated bit positions, but are shown as dashed boxes in FIG. 3 to indicate that they may be associated with the instruction in some other manner.

Op code decoder logic 311 within decode dispatcher 203 receives as input selective bits of an instruction in registers 204, and decodes the op code to output multiple decoded control lines, each line corresponding to one or more operations which can be specified or parameters of the operations. In the case of a load operation, one control line from op code decoder indicates a load. It will be appreciated that many instruction sets support multiple forms of load operation, and that additional control lines may be required for correctly decoding predicate 303 or performing other functions, depending on the type of load specified. For illustrative purposes herein, it is assumed that a single control line specifies a load operation.

Load/store pipeline 215 contains four parallel sections, labeled A, B, C and D. Each "section" is itself a complete pipeline, capable of managing a load operation from an independently specified source address to an independently specified destination. However, as explained in greater detail herein, the L1 D-Cache is divided into two banks, pipeline sections A and B accessing only Bank 0, and pipeline sections C and D accessing only Bank 1. First stage load/store registers 321–324 receive instruction data dispatched by decode dispatcher 203, and once loaded into first stage registers 321–324, the instruction data causes the load instruction to be executed in some architecturally determined number of pipeline stages. Load/store pipeline 215 is thus capable of initiating up to four independent load operations in a given cycle, provided certain conditions are met as explained herein.

Bank predict (BP) field 304 predicts the probable bank of L1 D-Cache from which the data referenced by the load instruction will be obtained. In the preferred embodiment, BP field 304 is a single bit. Confirmation field 305 is a field indicating a degree of confidence in the bank predict value. The confirmation field could be a single bit, but in the preferred embodiment is an up-or-down counter. If the counter equals or exceeds some threshold value, the bank prediction value is regarded as reliable.

Selector control logic 312 controls a bank of selectors 313–316, determining which selector(s), if any, will transmit instruction 301, effectively dispatching it to the load store pipeline. The load store control line (indicating a load/store operation) from op code decoder 311, the value of bank predict and value of confirmation field, are input to selector control logic 312. Additionally, selector control logic receives input from the decoding of other instructions in register 204 which might be dispatched in the same cycle. Selector control logic implements a set of logic functions essentially as follows:

SelA=Load AND LSAOpen AND {[BP=0 AND C≧TH] OR [(LSCOpen OR LSDOpen) AND C<TH)]}

Where SelA is the control line for Selector A 313, Load is a control line from Op Decoder 311 indicating that instruction 301 is a load instruction, LSAOpen, LSCOpen and LSDOpen indicate that load/store pipe sections A, C and D, respectively, are open for receiving an instruction in the current cycle (i.e. are not being allocated to a different load instruction), BP is the bank predict value of instruction 301, C is the confirmation value of instruction 301, and TH is the bank predict threshold. In other words, if instruction 301 is a Load and pipe section A is not occupied by another instruction, then Selector A is opened to dispatch instruction 301 to load/store pipe section A if either (a) the bank predict is 0 and the confirmation indicates confidence in the bank predict, or (b) one of pipe sections C or D is open and the confirmation indicates no confidence in the bank predict. Selectors B, C and D 314–316 are similarly controlled as follows:

SelB=Load AND LSBOpen AND–(LSAOpen) AND {[BP=0 AND C≧TH] OR [(LSCOpen OR LSDOpen) AND C<TH)]}

SelC=Load AND LSCOpen AND {[BP=1 AND C≧TH] OR [(LSAOpen OR LSBOpen) AND C<TH)]}

SelD=Load AND LSDOpen AND–(LSCOpen) AND { [BP=1 AND C≧TH] OR [(LSAOpen OR LSBOpen) AND C<TH)]}

It will be observed that, if the confirmation value meets the threshold, a load is preferentially dispatched to load/store pipe section A (for bank predict of 0) or section C (for a bank predict of 1). If the preferred pipe section is not available, the load is dispatched to pipe sections B or D, if available, according to the bank predict value. If the confirmation value does not meet the threshold, the load is dispatched to two pipe sections simultaneously, one in each bank (assuming two such sections are available). In this case, there is insufficient confidence in the bank predict value, and rather than risk an erroneous bank predict (with the need to restart the pipeline), the processor dispatches the same load operation to two separate pipeline sections, thus accessing both banks of the L1 D-cache.

A store instruction has a lower priority than a load instruction, and is deferred until no load instructions are ready to be dispatched to the corresponding L1 D-cache bank. If an instruction decodes as a store instruction, it is placed on store queue 205, deferring the instruction at least sufficiently long to generate the effective address of the store-to location, and thus determine with certainty the cache bank to be accessed. As explained herein, each bank supports only a single store instruction in a given cycle, so a store to bank 0 requires that there be no load instructions from that bank in the same cycle (no instructions dispatched to pipe sections A or B), and a store to bank 1 requires that there by no load instructions dispatched to pipe sections C or D.

Figure 4A:
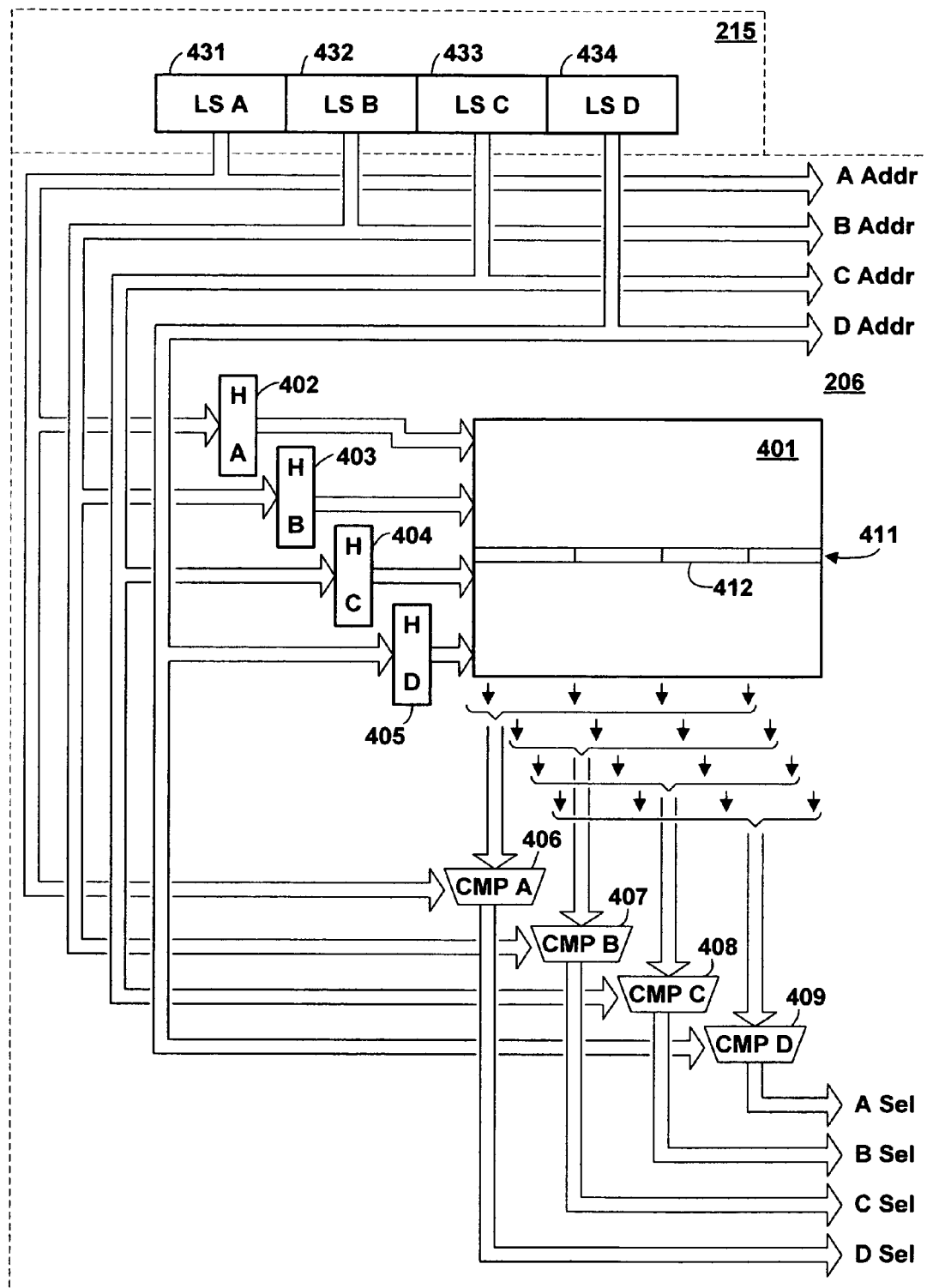
FIGS. 4A and 4B (herein collectively referred to as FIG. 4) are a representation of the structure of an L1 data cache, according to the preferred embodiment.
Figure 4B:
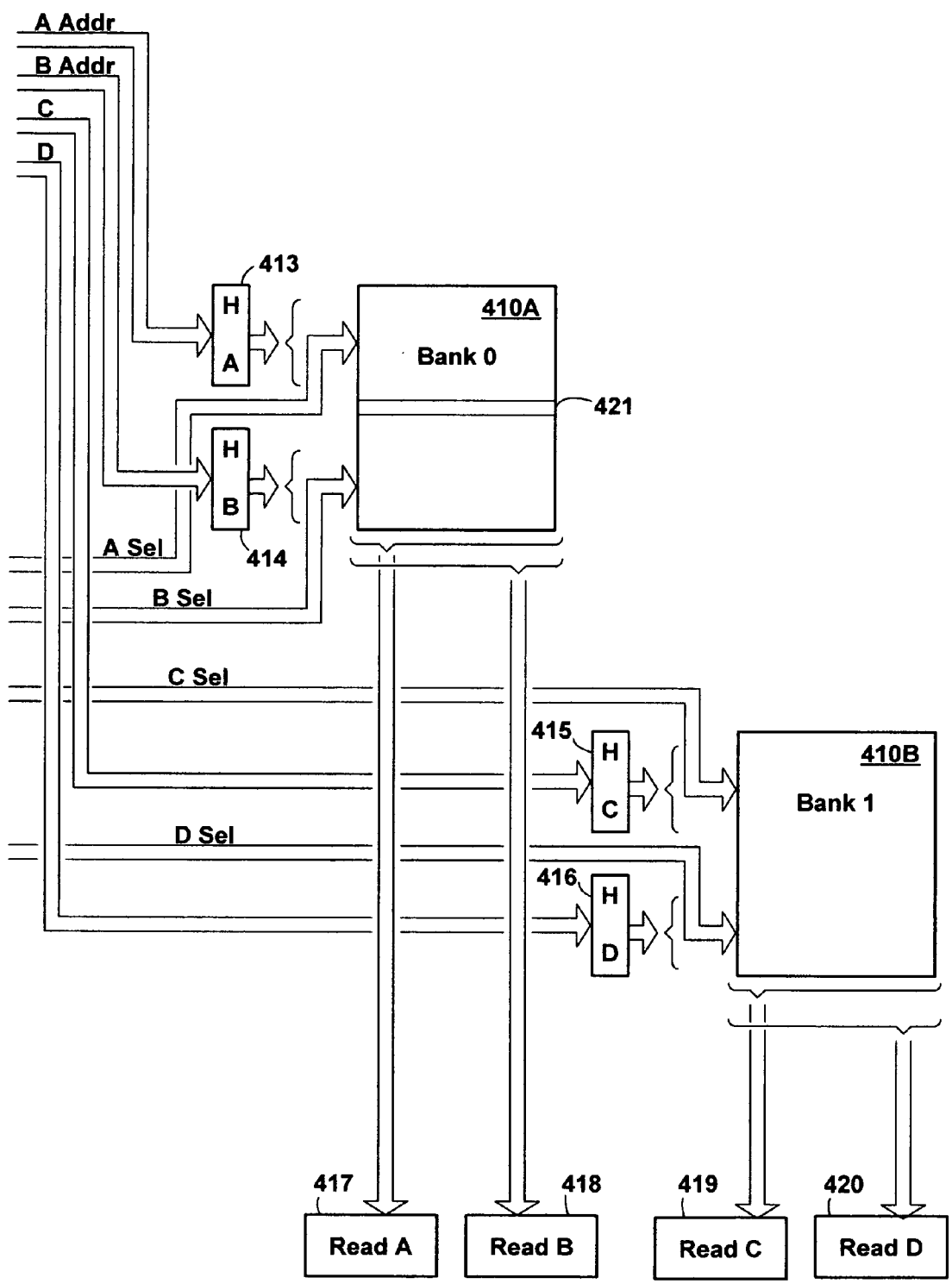

FIGS. 4A and 4B (herein collectively referred to as FIG. 4) are a representation of the structure of an L1 data cache 206, according to the preferred embodiment. Referring to FIG. 4, L1 D-cache comprises a cache data table, which contains the actual cached data, and a cache directory, or index. Cache 206 is organized as an associative cache, in which an associativity set of cache data entries, called lines, is determined by decoding selective bits of an address to be accessed, and a line within the associativity set is determined by comparing the desired address with cache directory entries, as is known in the art. In the preferred embodiment, the L1 D-cache contains about 64 Kbytes, is 4-way associative, and each cache line contains 128 bytes of data. However, these parameters are merely by way of example, and may vary.

The data table comprises two equal banks 410A and 410B (herein collectively referred to as feature 410). Each 128-byte cache line is divided equally between the two banks, 64 bytes being in bank 410A and 64 bytes being in bank 410B. Within the cache data table, each individual memory cell contains a single write input, and two read outputs, the read outputs being designated A and B and being under the control of respective independent control lines. The A bit outputs of corresponding bit positions of different double words (32 bits) of cache are tied together to form a read port A, and similarly the B bit outputs are tied together to form a read port B. Thus, each memory bank 410A, 410B has a pair of read ports, A and B, making four read ports in all. The operation of the memory cell is such that, although it can be read from either port A or port B or both in the same cycle, it can not be written to in the same cycle that it is read. Within any bank 410A, 410B, only one write operation can be performed in a given cycle, although it is possible to perform an independent write operation (or up to two independent read operations) in the other bank.

The cache directory contains rows 411 of index entries 412. Each index entry contains a portion of an effective address of a cache line, and certain control bits, such as a dirty bit, LRU bits, etc., as are known in the art. A cache directory row 411 is referenced by decoding or hashing a portion of the effective address of the desired data to obtain row select signal. Because cache 206 supports up to four read operations in a single cycle, four separate address hash/decoders 402–405 are used to access directory 401. Each address hash/decoder 402–405 corresponds to a respective section of load/store pipe 215, and obtains the effective address to be accessed from a corresponding register 431–434 of load/store pipe 215.

The effective addresses in the four index entries 412 within a selected row 411 are compared with the effective address of the desired data access from the corresponding one of registers 431–434 by a corresponding one of comparators 406–409. If there is a match, then a cache line select signal is generated by the comparator, for use in selecting a cache line from cache data table 410. If there is no match, then the desired effective address is not in the L1 D-cache 206, and appropriate action is taken to obtain the data from a lower level cache or main memory. The hardware used for loading new data responsive to a cache miss is not shown in FIG. 4.

It will be observed that, as represented in FIG. 4, cache directory 401 contains four separate address decoders 402–405 and four separate read ports corresponding to the four comparators 406–409. This is intended as a simplified representation for illustrative purposes. While it would be possible to design each individual memory cell in directory 401 to support four separate read ports, it would alternatively be possible to use two separate copies of the cache directory, each copy having only two separate address decoders and two separate read ports, and the use of such dual copies is the embodiment preferred herein. The rationale for such a design is that it would enable use of the same basic memory cell as is used in the cache data table 410. The cache directory being relatively small compared to the data table, use of a dual copy directory would not require a large amount of additional chip storage.

To access a cache data table, a portion of the effective address is decoded by a corresponding decoder 413–416 to select an associative set of four cache lines 421. Within the associative set, the selection signal generated by the corresponding comparator 406–409 selects one of the cache lines for output on the corresponding read port to one of read registers 417–420. In fact, the cache reads a double word (32 bits) of data at a time, so additional address bits are used to select the 32 bits to be read from within the selected cache line.

It will be observed that, where the load instruction has a bank predict value which is considered reliable (confirmation value meets threshold), as described above, the load instruction will be dispatched to only one of the load/store pipeline's parallel sections, and only one of registers 431–434 will contain the effective address of the instruction. In this case, only one of the cache banks will be accessed. I.e., if the effective address is in either the A or B register 431, 432, cache bank 410A will be accessed. If the effective address is in either the C or D registers 433, 434, cache bank 410B will be accessed. If, however, the original load instruction's confirmation value did not meet the threshold, the bank predict was considered unreliable, and two copies of the instruction will exist in the load/store pipeline. One copy of the effective address will be in either register 431 or 432, and will be used to access bank 410A, while the other copy will be in either register 433 or 434, and will be used to access bank 410B.

In the case of a store instruction, the cache bank will be known at the time of dispatch, and the store will be dispatched to either pipe section A (corresponding to cache bank 410A or pipe section C (corresponding to cache bank 410B), and the store-to address will be contained in either register 431 or 433, accordingly. Certain hardware for supporting storage of data to a cache line is omitted for clarity of illustration.

Figure 5:
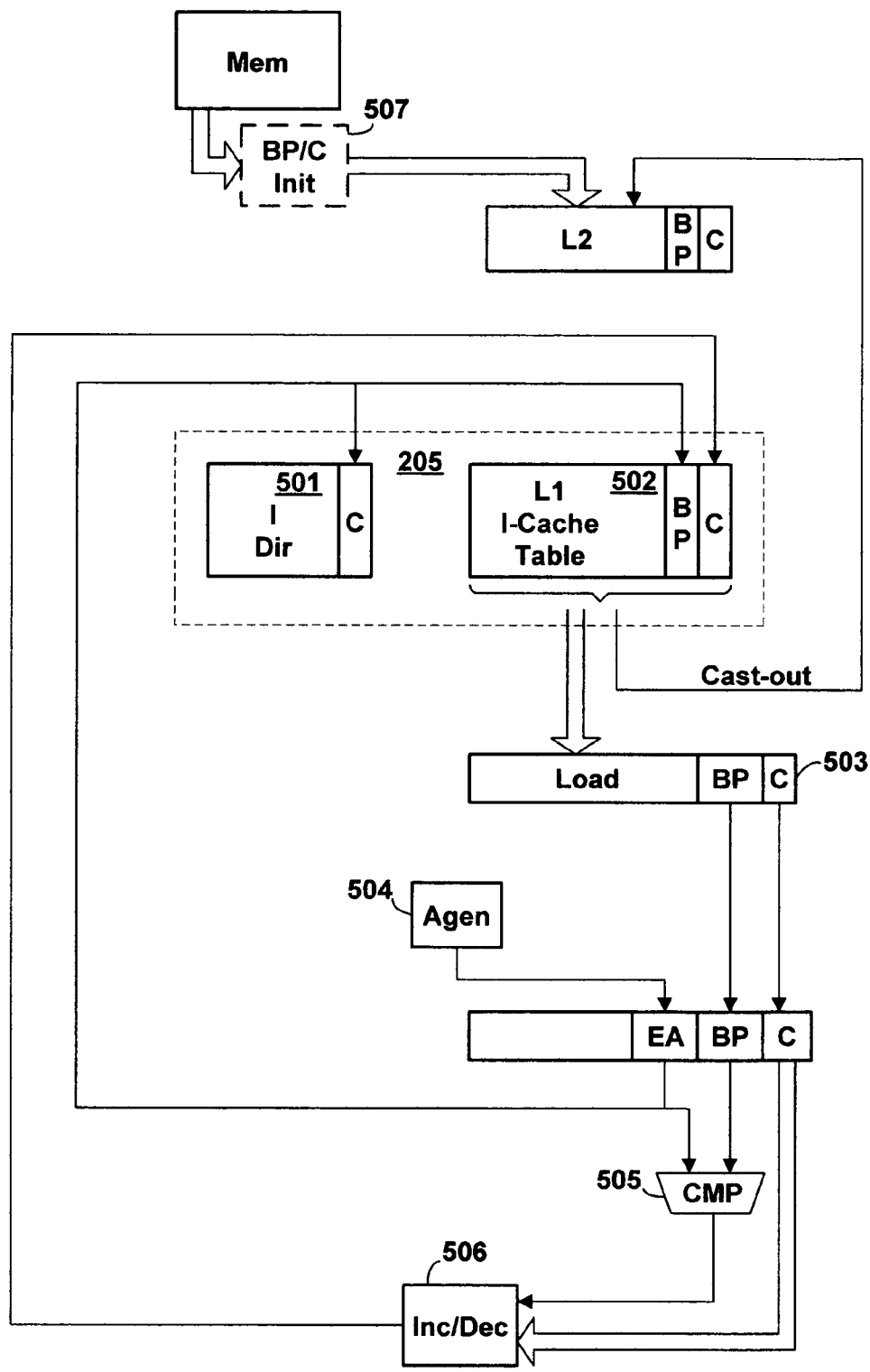
FIG. 5 illustrates at a high level the major hardware structures involved in maintaining the bank predict and confirmation values and their interaction, according to the preferred embodiment.

In the preferred embodiment, the bank predict value and the confirmation value are maintained in processor hardware. FIG. 5 illustrates at a high level the major hardware structures involves in maintaining the bank predict and confirmation values, and their interaction. The bank predict value is updated with each execution of the load instruction, to reflect the bank which was accessed in the most recently executed load instruction. The confirmation value is an up-or-down counter which is incremented or decremented with each execution of the load instruction, the counter being incremented if the bank predict value was correct, and decremented if incorrect.

Referring to FIG. 5, an L1 I-cache 205 comprises a cache directory 501 and cache data table 502, as is conventionally known. A bank predict and confirmation value are associated with each load instruction in cache data table 502, as previously explained. These values are imported into an instruction register 503 when the load instruction is loaded to a register. When a load instruction is dispatched to load/store pipe 215, an address generator 504 determines the effective address of the data reference, i.e. the data to be loaded from cache by the load instruction. Generation of an effective address typically requires computation, e.g., some offset value within the instruction may be added to a base value from a register. This computation may require one or more processor cycles, during which the load instruction is in the load/store pipe. When the address generator makes the effective address available, the address is used to access the L1 D-cache 206, as explained above. At the same time, one or more bits of effective address sufficient to determine the L1 cache bank are compared with the bank predict field of the instruction by comparator 505. (In the preferred embodiment, in which cache banks are interleaved every 64 bytes, a single address bit six bit positions from the lowest order address bit is sufficient to determine the cache bank.) If the cache bank as determined by the address generator matches the cache bank as determined by the bank predict field, a corresponding signal is output by comparator 505. Incrementer/decrementer 506 then increments or decrements the confirmation value by a pre-determined amount, according to the output of comparator 505. I.e., if the cache bank predicted by the bank predict field matched the actual computed cache bank, the confirmation value is incremented; if not, it is decremented.

The amount of increment or decrement will be a matter of design choice, and is not necessarily the same for increments as for decrements. The relative amount will depend on the number and configuration of cache banks, as well as the relative performance cost of an erroneous cache bank prediction versus a deferring of a load instruction that could have been performed had there been a higher level of confidence in the bank prediction. The number and configuration of cache banks affects the probability that a cache bank mis-prediction will cause an actual hardware conflict, as discussed in greater detail below. If an actual hardware conflict occurs, an erroneous cache bank prediction typically is not detected for several cycles after the load instruction is dispatched. Such a conflict may require that the load/store pipe (and, potentially, other pipelines) be halted and certain instructions re-started. The effect on performance of such a conflict is generally significantly greater than the effect of deferring a load instruction to a later cycle. Accordingly, it is preferred that the decrement of the confirmation value in the event of a mis-prediction be greater in magnitude than the increment of the value in the event of correct prediction. For example, if the decrement is 4 and the increment is 1, then the confirmation value will, on the average, rise if the ratio of correct predictions to mis-predictions is at least 4:1, and will eventually meet the threshold value, allowing bank prediction to be used for dispatching the instruction. If the proportion of correct predictions is less than 80%, the confirmation value will generally remain low and not reach the threshold. The choice of threshold value and initial confirmation value will affect the number of executions needed to reach the threshold. E.g., for a decrement of 4 and increment of 1, a threshold of 6 might be chosen. It will be noted that the bank predict and confirmation value are updated for each execution of the load instruction, whether or not the bank predict field was actually used when dispatching the load instruction In a typical environment, it is expected that most load instructions are highly predictable, meaning that they reference the same cache bank every time, or very nearly every time. A smaller but significant number of load instructions are unpredictable, exhibiting a more or less random reference pattern. The purpose of the confirmation value is to identify those load instructions which have an unpredictable reference pattern, so that these load instructions can be scheduled to all banks simultaneously, and thus avoid conflicts. The confirmation value will not necessarily identify load instructions having a prediction accuracy somewhere in between (e.g., 80–90%), but it is expected that such instructions will be rare. In the above example, a decrement to increment ratio of 4:1 will generally identify the load instructions having random reference patterns and prevent use of bank prediction for such instructions.

The update bank predict value and confirmation value are written to the appropriate locations in L1 I-cache data table 502. At the same time, a change bit or dirty bit in the L1 I-cache director 501 is set on to indicate that the corresponding line of L1 I-cache has changed. When a line is cast out of L1 I-cache, it is written to L2 cache if the change bit in L1 I-cache directory indicates that the line has changed.

When a cache line is initially loaded into L2 cache from main memory, the bank predict and confirmation values are initialized, if necessary, by optional BP/C initialization hardware 507. Preferably, the confirmation value is initialized to zero, although other values could be used; the initial value of the bank predict may be chosen at random. Initialization hardware 507 is optional because it may be unnecessary, depending on the way in which bank predict and confirmation values are stored. If, e.g., bank predict and confirmation values are simply stored in unused bits of the load instruction, the compiler may initialize the confirmation value to zero, making initialization hardware 507 unnecessary. If, however, a load instruction must be re-encoded to make room for the bank predict and confirmation fields, then re-encoding should be performed by hardware when the load instruction is loaded to cache from memory. In this case, initialization hardware will examine any cache line containing instructions for a load instruction, and re-encode as required. Information in the page table in memory may be used to determine whether data being loaded to the L2 contains instructions or other data, and invoke the initialization accordingly. Alternatively, it may be assumed that data being loaded to the L2 responsive to an L1 I-cache miss or prospective fetch for the I-cache contains instructions.

In the illustration of FIG. 5, it is assumed that there are only two cache levels, and that bank predict and confirmation values are maintained in the L1 and L2, but not main memory. As is known, there could be more than two cache levels, and bank predict and confirmation values could be maintained in lower levels of cache. Preferably, where there are multiple cache levels, bank predict and confirmation values are kept at the lowest cache level, but not kept in main memory. Alternatively, these values could be maintained in main memory as well.

In the illustrative embodiment, the L1 data cache is divided into two banks. Such a design is easier to implement than a design involving a greater number of banks, but in general requires greater prediction accuracy. The required prediction accuracy declines as the number of cache banks increases, because the probability that a mis-prediction will cause an actual hardware conflict decreases with a larger number of cache banks. Of course, a larger number of cache banks generally requires additional hardware, and so is more difficult to implement. Thus, a designer must choose an appropriate number of cache banks based on, among other factors, the cost of additional cache banks, expected prediction accuracy, and the relative performance cost of actual cache conflict.

Figure 7:
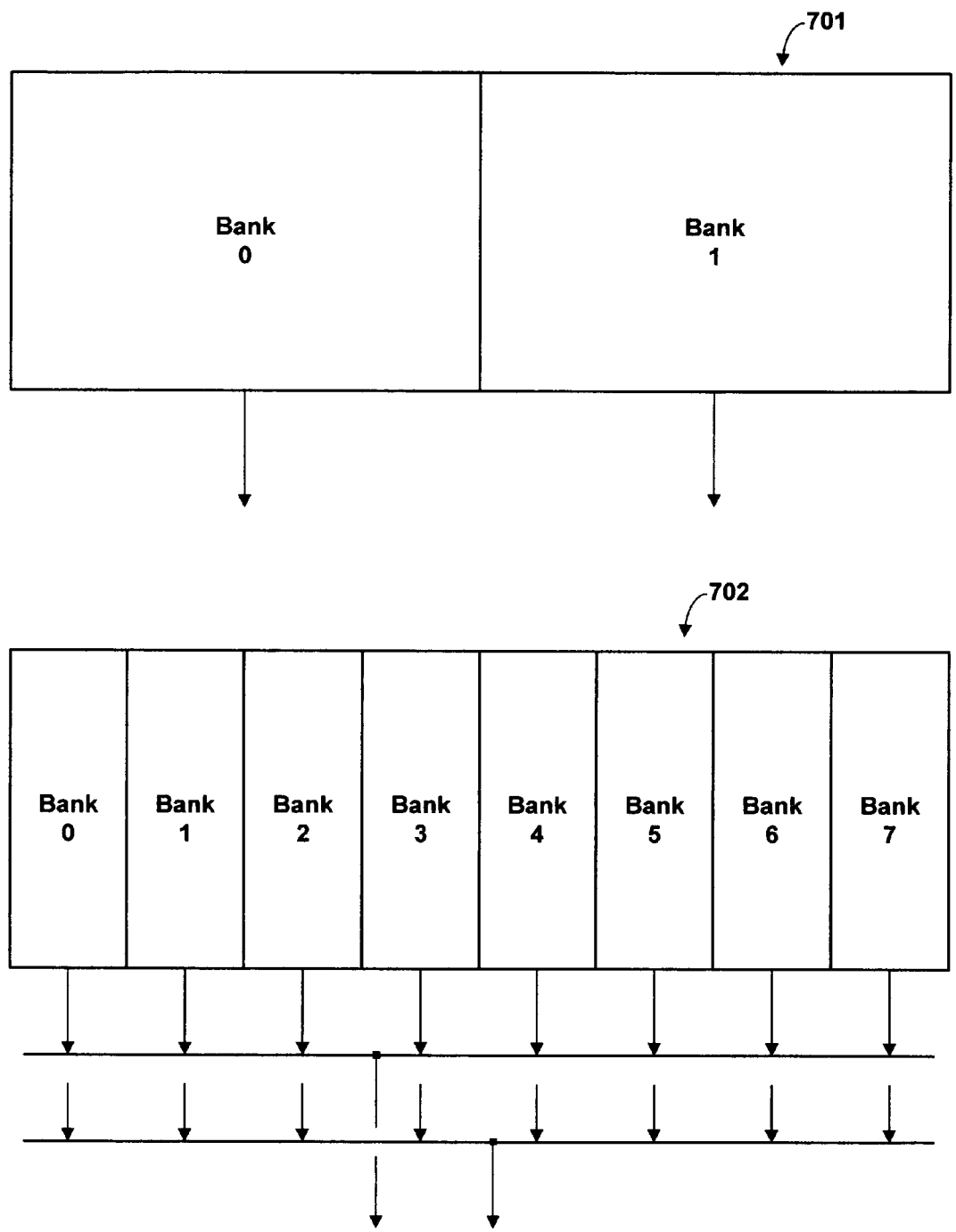
FIG. 7 is an example of two alternative cache configurations having different numbers of banks for illustrating the effect of number of banks on required prediction accuracy, according to the preferred embodiment.

This principle can be illustrated by reference to the simplified hardware configuration examples of FIG. 7. FIG. 7 illustrates a first data cache 701 divided into two banks, each bank having a single read port, and a second data cache 702 of identical size as cache 701, divided into eight banks, each bank having a single read port, which can selectively be output to either of the two read buses. The effect of configurations of caches 701 and 702 is that two simultaneous loads from the cache can be performed, provided the loads are from different banks. More than two simultaneous loads are not supported, since there are only two read outputs from the cache.

If two load instructions are scheduled in the same cycle, then the probability of a conflict is a function of the probability of a mis-prediction and the probability that, given a mis-prediction, the actual cache bank required is the same as the one required by the other load operation. Where there are only two banks, as in the example of cache 701, this second factor has a high probability, but it declines as the number of cache banks increases. In other words, even if the bank prediction is wrong, pure random luck improves the odds that no conflict will occur as the number of cache banks increases. The probability of a conflict can be expressed as:

$$P_{Con} = 2P_{Pred}(1-P_{Pred})(1/(B-1)) + (1-P_{pred})^2(B-2)/(B-1)^2$$

where $P_{Con}$ is the probability of a conflict, $P_{Pred}$ is the probability of a correct bank prediction, and B is the number of cache banks. For relatively high values of $P_{pred}$, the second term (representing a probability that both load operations mis-predict their cache banks) can be neglected, and the probability of a conflict is approximately $2(1-P_{pred})/(B-1)$. For a given probability of a correct prediction, cache bank 701 is approximately seven times as likely to produce a conflict. It will be recognized that these probabilities will vary with different configurations, such as a configuration supporting multiple read ports per cache bank, as in the preferred embodiment. However, the general principle that a greater number of cache banks requires lower prediction accuracy remains the same.

Typically, the penalty for a load conflict is sufficiently great that bank prediction accuracy must be relatively high. For example, restarting the load pipeline after a conflict is detected may cause a penalty in the neighborhood of 30 cycles. If a system with a simple 2-bank cache 701 is used, then even for a prediction accuracy of 99%, a conflict will occur approximately 2% of the time, giving an average penalty of approximately 0.6 cycles/load, which is considered unacceptable. For such a configuration, a prediction accuracy of 99.5% or greater is needed. However, for the 8-bank cache and the same 99% prediction accuracy, the probability of a conflict drops to about 0.3%, giving an average penalty of approximately 0.09 cycles/load, which is considered acceptable. The calculations will vary, and become more complex, where each cache bank has multiple output ports.

Computer system 100 may include an optional feedback mechanism for providing performance data regarding the consistency of data alignment in load operations. Such data might be used for performance analysis of the pattern of data accesses in a program, and where supported, might be used by an optimizing compiler to improve the data alignment in pages exhibiting poor alignment. I.e., if it is known that the load operations in a particular program or program segment exhibit poor bank prediction consistency, it may be possible to alter the program data structures so that the data is aligned on predictable boundaries, resulting in more consistent bank prediction and improved program performance in a system using cached bank prediction.

Figure 6:
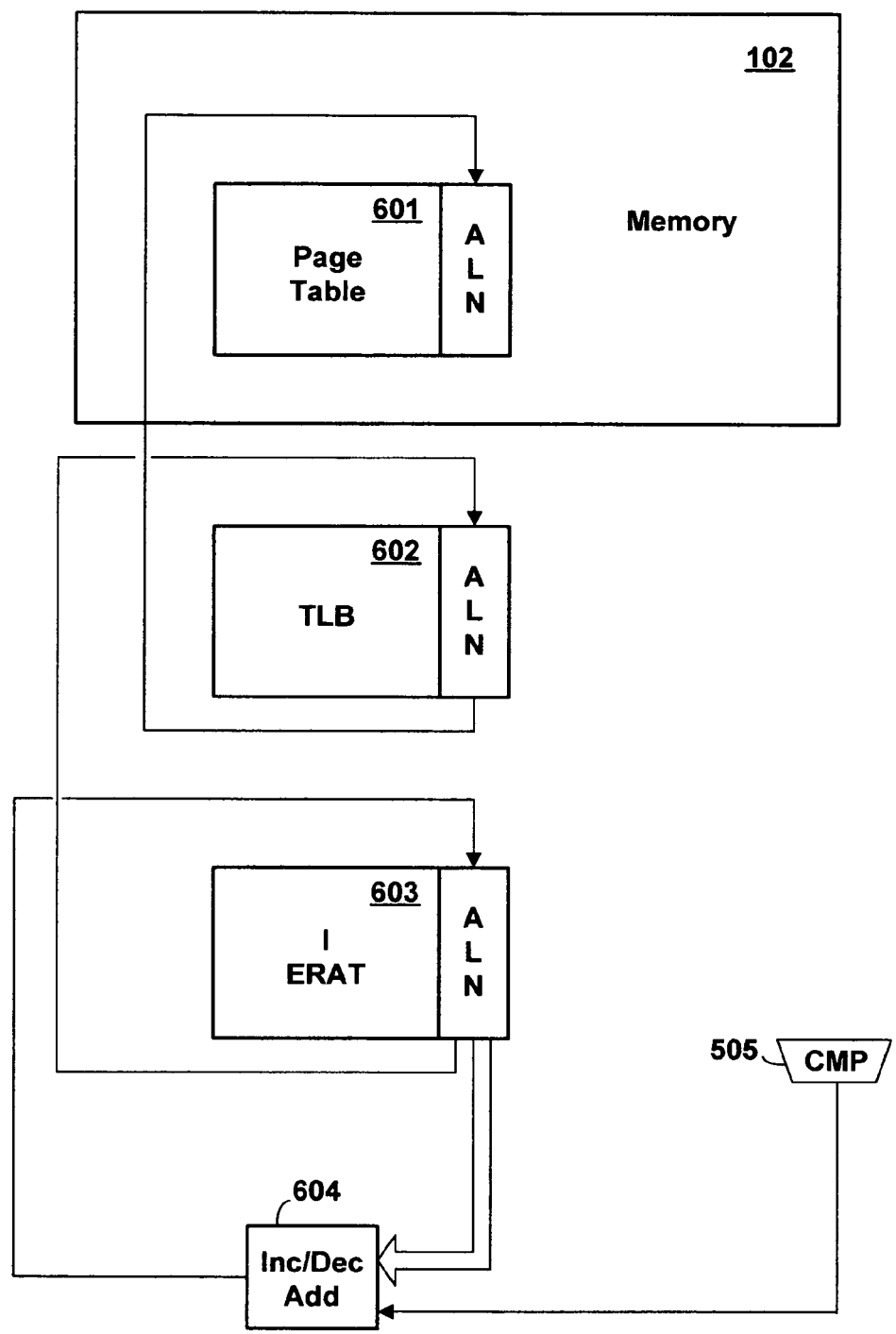
FIG. 6 illustrates at a high level the major hardware structures involved in providing performance feedback data regarding the consistency of data alignment in load operations, according to the preferred embodiment.

FIG. 6 illustrates the operation of such an optional feedback mechanism. The feedback mechanism associates an alignment counter field (ALN) with each memory page of executable instructions. The ALN counter field could be a single up-or-down counter, similar to the confirmation value, or could be a pair of counters, one of which counts number of load operations, and the other of which counts number of bank mis-predictions. In the preferred embodiment, the ALN counter is a simple up-or-down counter, which requires fewer bits than a pair of counters, although it conveys less information. The ALN counter is incremented whenever a load instruction within the page correctly predicts the cache bank, and decremented whenever a load instruction incorrectly predicts the cache bank.

Referring to FIG. 6, the current ALN counter value for a currently executing page of instructions is associated with the page entry in the instruction ERAT 603 (which is a portion of ERAT 224). Comparator 505 detects a correct bank prediction or mis-prediction. Responsive to detection of a correct or incorrect bank prediction, increment/decrement hardware 604 increments or decrements the ALN counter value as appropriate, and the value in instruction ERAT 603 is updated accordingly. As in the case of the confirmation value, the ALN value may be incremented by one amount and decremented by a different amount. Although FIG. 6 indicates that the updated ALN counter is written immediately to ERAT 603, in fact it may be held in a register (not shown) and accumulated while instructions of the current page are being executed, to be written to ERAT 603 when an instruction from a new page is executed.

When a page entry is cast out of ERAT 603, the ALN value is written out to a corresponding field in translation look-aside buffer 602, and from there it is ultimately written out to a corresponding field in page table 601 of main memory. In the preferred embodiment, ALN values are not saved in storage, so the life of the ALN counter is limited to the life of the corresponding page in main memory.

Preferably, software performance tools can access the ALN values from the page table in main memory, to record bank prediction performance of different pages of instructions. Such performance tools may further include commands for writing ALN values from the TLB to the page table, to assure that the ALN values in page table are relatively current.

It will be observed that, since a separate instruction ERAT 603 is associated with each processor, it is possible in a multi-processor system that different processors will be executing the same page of instructions simultaneously, and different instruction ERATs will be independently updating ALN values. In the preferred embodiment, there is no cache coherency hardware which prevents this condition, and the last ERAT value to be written out to the TLB will overwrite a previously written value from another ERAT. Although this could introduce an inaccuracy in the ALN value, the benefit of more accurate ALN values would not appear to justify the cost of additional cache coherency hardware.

Although various data structures are illustrated herein having a table-like structure for clarity, in fact the structures may be more complex, and data "entries" in these structures may be fragmented, so that portions of an entry are in one location and other portions in another location.

In the preferred embodiment, both a bank predict and a confirmation value are associated with the load instruction, the confirmation value indicating some degree of confidence in the bank predict value. However, in an alternative embodiment, the load instruction might contain only a bank predict value, without any confirmation value. Alternatively, in order to reduce the amount of cache memory required, a confirmation value might be associated with groups of instructions, such as a cache line of instructions or page of instructions, the confirmation value indicating a composite degree of confidence for all load instructions within the group. Furthermore, while in the preferred embodiment the confirmation value is an up-ro-down counter, a confirmation value may be maintained in a different form, or might be incremented/decremented on different events. For example, the confirmation value might be a single bit indicating confidence or no confidence, which might be set by the hardware to indicate confidence if the previous instruction accessed the same bank, or no confidence if it accessed a different bank. Alternatively, such a bit might be set by the compiler.

In the preferred embodiment, bank predict and confirmation values are maintained automatically by the hardware, and are not generated by the compiler as a permanent part of the instruction, or stored permanently in storage. However, it would alternatively be possible to save both the bank predict and confirmation values in storage when a page containing instructions is paged out, and further be possible for the compiler to initialize bank predict values when the code is compiled. A bank predict and/or confirmation value set by the compiler might be regarded as permanent (in which case the hardware would not change such values), or might be simply initial values which are changed during execution by the hardware, as described herein or using other techniques.

In the preferred embodiment, a computer system uses a three-level addressing scheme, in which effective addresses are translated to virtual addresses, which in turn are translated to real addresses. Level 1 caches are accessed with effective addresses, while lower level caches and main memory are accessed with real addresses. However, the present invention is not limited to any particular addressing scheme, and would be applicable to systems having fewer than three levels of addressing, or more than three levels of addressing. Furthermore, a computer system in accordance with the present invention may have different forms of address translation structures, and in particular, need not have an ERAT. Additionally, different types of addresses might be used for cache access, in particular, level 1 caches might be accessed with real addresses.

Although a specific embodiment of the invention has been disclosed along with certain alternatives, it will be recognized by those skilled in the art that additional variations in form and detail may be made within the scope of the following claims:

What is claimed is:

1. A digital data processing device, comprising:
   instruction logic which selects and decodes instructions for execution;
   execution logic which executes instructions;
   a first cache for temporarily storing data, said first cache comprising a plurality of banks, each bank containing at least one respective access port for accessing data in the bank; and
   wherein at least some said instructions, when executed by said execution logic, access said first cache to perform at least one of: (a) reading data from said first cache, and (b) writing data to said first cache, and wherein a respective bank predict value is associated with each of said at least some instructions accessing said first cache, each said bank predict value predicting a bank of said first cache to be accessed by said bank predict value's associated instruction; and
   wherein said instruction logic selects, from among a set of multiple instructions eligible to execute by said execution logic, a subset of multiple instructions for concurrent execution by said execution logic, said instruction logic using said bank predict values of said instructions to select multiple instructions which access said first cache for inclusion in said subset.

2. The digital data processing device of claim 1, further comprising a second cache for temporarily storing data, wherein said second cache stores instructions executable by said execution logic and said first cache stores data other than instructions, and wherein said bank predict values are stored in said second cache.

3. The digital data processing device of claim 1, wherein each said bank of said first cache contains a plurality of read ports and at least one write port.

4. The digital data processing device of claim 1,
wherein a respective confirmation value is associated with each said instruction with which a bank predict value is associated, each confirmation value reflecting a degree of confidence in the respective bank predict value; and
wherein said instruction logic uses both said bank predict values and said confirmation values of said instructions to select multiple instructions which access said first cache for concurrent execution.

5. The digital data processing device of claim 4,
wherein said digital data processing device dynamically maintains said confirmation values.

6. The digital data processing device of claim 5,
wherein each said confirmation value is a counter which is incremented for each correct bank prediction and decremented for each incorrect bank prediction.

7. The digital data processing device of claim 1, further comprising:
feedback logic which maintains bank prediction history data in a form accessible to a programmer, said bank prediction history data recording the performance of bank predictions by said bank predict values during execution of a computer program.

8. The digital data processing device of claim 1,
wherein said instruction logic concurrently selects and decodes instructions for execution from a plurality of threads.

9. The digital data processing device of claim 1,
wherein said digital data processing device is implemented in a single semiconductor chip.

10. A computer system, comprising:
a memory;
at least one processor, said processor communicating with said memory over at least one communications path, said processor including instruction logic for selecting and decoding instructions for execution, and execution logic for executing instructions
a first cache coupled to said processor and temporarily storing data from said memory, said first cache comprising a plurality of banks, each bank containing at least one respective access port for accessing data in the bank; and
wherein at least some said instructions, when executed by said execution logic, access said first cache to perform at least one of: (a) reading data from said first cache, and (b) writing data to said first cache, and wherein a respective bank predict value is associated with each of said at least some instructions accessing said first cache, each said bank predict value predicting a bank of said first cache to be accessed by said bank predict value's associated instruction; and
wherein said instruction logic selects, from among a set of multiple instructions eligible to execute by said execution logic, a subset of multiple instructions for concurrent execution by said execution logic, said instruction logic using said bank predict values of said instructions to select multiple instructions which access said first cache for inclusion in said subset.

11. The computer system of claim 10, further comprising a second cache for temporarily storing data, wherein said second cache stores instructions executable by said processor and said first cache stores data other than instructions, and wherein said bank predict values are stored in said second cache.

12. The computer system of claim 10, wherein each said bank of said first cache contains a plurality of read ports and at least one write port.

13. The computer system of claim 10,
wherein a respective confirmation value is associated with each said instruction with which a bank predict value is associated, each confirmation value reflecting a degree of confidence in the respective bank predict value; and
wherein said instruction logic uses both said bank predict values and said confirmation values of said instructions to select multiple instructions which access said first cache for concurrent execution.

14. The computer system of claim 13,
wherein said computer system dynamically maintains said confirmation values.

15. The computer system of claim 14,
wherein each said confirmation value is a counter which is incremented for each correct bank prediction and decremented for each incorrect bank prediction.

16. The computer system of claim 10, further comprising:
feedback logic which maintains bank prediction history data in a form accessible to a programmer, said bank prediction history data recording the performance of bank predictions by said bank predict values during execution of a computer program.

17. The computer system of claim 10,
wherein said instruction logic concurrently selects and decodes instructions for execution from a plurality of threads.

18. The computer system of claim 10,
wherein said computer system comprises a plurality of caches at different cache levels, said first cache being at a level closest said processor.

19. The computer system of claim 10,
wherein said computer system comprises a plurality of said processors, each processor being coupled to a respective first cache, and wherein said bank predict values associated with instructions are maintained in a location accessible to each of said plurality of processors.

20. A digital data processing device, comprising:
a cache for temporarily storing data, said cache comprising a plurality of banks, each bank containing at least one respective access port for accessing data in the bank;
execution logic for executing multiple instructions concurrently;
instruction logic for selecting and dispatching, in each of multiple execution dispatch cycles, a respective subset of instructions for concurrent execution, each said subset of instructions being selected from among a respective set of instructions eligible for execution dispatch, wherein for at least some said respective sets of instructions eligible for execution dispatch, the corresponding subset of instructions selected for concurrent execution is smaller than the respective set of instructions eligible for execution dispatch, wherein at least some of said instructions access said cache, said instruction logic using a respective bank predict value associated with at least some instructions accessing said cache to select instructions for inclusion in said subsets by predicting whether multiple instructions accessing said cache can be concurrently executed without conflict by said processing device, each respective said bank predict value predicting a bank of said cache to be accessed by said bank predict value's associated instruction.

* * * * *